US012283746B2

(12) United States Patent
Mak et al.

(10) Patent No.: US 12,283,746 B2
(45) Date of Patent: Apr. 22, 2025

(54) ANTENNA EMBEDDED IN A RADOME

(71) Applicant: GOGO BUSINESS AVIATION LLC, Broomfield, CO (US)

(72) Inventors: Alan Mak, Boulder, CO (US); Matthew J. Dufner, Elmhurst, IL (US)

(73) Assignee: GOGO BUSINESS AVIATION LLC, Broomfield, CO (US)

( * ) Notice: Subject to any disclaimer, the term of this patent is extended or adjusted under 35 U.S.C. 154(b) by 0 days.

(21) Appl. No.: 17/065,210

(22) Filed: Oct. 7, 2020

(65) Prior Publication Data

US 2021/0111485 A1 Apr. 15, 2021

Related U.S. Application Data

(60) Provisional application No. 62/913,539, filed on Oct. 10, 2019.

(51) Int. Cl.

*H01Q 1/42* (2006.01)
*H01Q 1/28* (2006.01)
*H01Q 1/40* (2006.01)
*H01Q 1/48* (2006.01)
*H01Q 3/36* (2006.01)

(52) U.S. Cl.

CPC ................. *H01Q 1/42* (2013.01); *H01Q 1/28* (2013.01); *H01Q 1/40* (2013.01); *H01Q 1/48* (2013.01); *H01Q 3/36* (2013.01)

(58) Field of Classification Search

CPC H01Q 1/405; H01Q 1/28; H01Q 1/40; H01Q 1/286–287; H01Q 1/42

See application file for complete search history.

(56) References Cited

U.S. PATENT DOCUMENTS

| | | | | | |
|---|---|---|---|---|---|
| 3,820,117 | A * | 6/1974 | Hall | H01Q 21/29 | 343/895 |
| 4,010,470 | A * | 3/1977 | Jones, Jr. | H01Q 1/405 | 343/846 |
| 4,101,895 | A * | 7/1978 | Jones, Jr. | H01Q 1/405 | 343/846 |
| 4,386,356 | A * | 5/1983 | Tricoles | H01Q 1/405 | 342/445 |
| 4,460,901 | A * | 7/1984 | Tricoles | H01Q 1/281 | 343/815 |
| 5,325,103 | A * | 6/1994 | Schuss | H01Q 1/40 | 343/705 |
| 5,392,053 | A * | 2/1995 | Hirata | H01Q 1/42 | 343/705 |

(Continued)

FOREIGN PATENT DOCUMENTS

| | | | | |
|---|---|---|---|---|
| AU | 2007313940 | B2 * | 7/2011 | H01Q 1/283 |
| AU | 2007313941 | B2 * | 9/2011 | H01Q 1/283 |

(Continued)

*Primary Examiner* — Ricardo I Magallanes

(74) *Attorney, Agent, or Firm* — MARSHALL, GERSTEIN & BORUN LLP; Randall G. Rueth

(57) ABSTRACT

An aircraft-mounted mobile communicator for communicating with one or more satellites or base stations is disclosed. The aircraft-mounted mobile communicator includes a radome structure and one or more antenna elements embedded within or proximate to a shell of the radome structure that maximizes an aperture of the one or more antenna elements, wherein the one or more antenna elements are configured to operate over one or more frequency bands.

18 Claims, 4 Drawing Sheets

(56) References Cited

U.S. PATENT DOCUMENTS

| | | | | |
|---|---|---|---|---|
| 2003/0210202 | A1* | 11/2003 | Desargant | H01Q 19/19 343/705 |
| 2004/0017322 | A1* | 1/2004 | Bostwick | H01Q 13/18 343/772 |
| 2004/0196192 | A1* | 10/2004 | Boyd | H01Q 1/38 343/700 MS |
| 2006/0227048 | A1* | 10/2006 | Mak | H01Q 21/08 342/359 |
| 2007/0253827 | A1* | 11/2007 | Dahl | B64D 45/02 29/825 |
| 2008/0106482 | A1* | 5/2008 | Cherrette | H01Q 1/28 343/893 |
| 2011/0291908 | A1* | 12/2011 | Hook | H01Q 21/061 343/841 |
| 2012/0249358 | A1* | 10/2012 | Stratis | G01S 7/024 342/174 |
| 2013/0016019 | A1* | 1/2013 | Stoneback | B29C 70/30 343/705 |
| 2014/0152526 | A1* | 6/2014 | Greig | H01Q 7/00 343/866 |
| 2015/0130673 | A1* | 5/2015 | Ng | H01Q 15/008 716/122 |
| 2015/0380811 | A1* | 12/2015 | Schoenlinner | H01Q 1/42 343/872 |
| 2017/0187100 | A1* | 6/2017 | Fotheringham | H01Q 19/067 |
| 2017/0201017 | A1* | 7/2017 | Cordone | H01Q 1/28 |
| 2017/0271745 | A1* | 9/2017 | Yun | H01Q 1/42 |
| 2017/0301987 | A1* | 10/2017 | Mack | H01Q 3/08 |
| 2017/0352948 | A1* | 12/2017 | Urcia | H01Q 1/286 |
| 2018/0031699 | A1* | 2/2018 | Bunch | H01Q 1/40 |
| 2018/0040945 | A1* | 2/2018 | Bernus | G01F 23/284 |
| 2018/0331424 | A1* | 11/2018 | Sclafani | H01Q 1/42 |
| 2019/0157772 | A1* | 5/2019 | Timmins | H01Q 1/288 |
| 2019/0190131 | A1* | 6/2019 | Lavin | B32B 5/245 |
| 2020/0036405 | A1* | 1/2020 | Bolton | H01Q 1/28 |
| 2020/0274236 | A1* | 8/2020 | Costello | H01Q 9/0407 |
| 2020/0358171 | A1* | 11/2020 | Lecerf | H01Q 9/0407 |
| 2021/0218153 | A1* | 7/2021 | Chapman | H01Q 1/42 |
| 2021/0305709 | A1* | 9/2021 | Goldberg | H01Q 13/085 |

FOREIGN PATENT DOCUMENTS

| | | | | |
|---|---|---|---|---|
| DE | 102006005902 | A1 * | 8/2007 | H01Q 1/12 |
| EP | 3085617 | B1 * | 9/2020 | B32B 5/02 |
| EP | 3866261 | A1 * | 8/2021 | B32B 27/08 |
| FR | 2686739 | A1 * | 7/1993 | H01Q 1/405 |
| KR | 101092752 | B1 * | 12/2011 | |
| WO | WO-9421003 | A1 * | 9/1994 | H01Q 1/283 |
| WO | WO-2020260311 | A1 * | 12/2020 | H01Q 1/283 |

* cited by examiner

ANTENNA EMBEDDED IN A RADOME

CROSS REFERENCE TO RELATED APPLICATIONS

This present disclosure claims the benefit of U.S. Provisional Patent Application No. 62/913,539, entitled "An Antenna Embedded in a Radome of an Aircraft" and filed on Oct. 10, 2019, which is incorporated herein in by reference in its entirety.

FIELD OF INVENTION

The present disclosure generally relates to antennas, and more specifically to antennas embedded or otherwise contained within a radome.

BACKGROUND

In implementing an antenna on an aircraft for example, an important consideration, among others, when determining where to place the antenna on the aircraft is the aperture size of the antenna. The larger the aperture size, the larger the antenna's efficiency (e.g., gain and gain-to-noise-temperature (G/T) for both transmit and receive communications, respectively) for delivering higher data rates. Other considerations relate to cost, aesthetics, and availability of space on the exterior of the aircraft.

Many aircrafts (e.g., commercial aircrafts) include radome-protected antennas on the top part of the fuselage when the radome is protecting a radio communications antenna (e.g., a satellite communications antenna), or on the bottom of the fuselage when protecting radio antennas for ground based communication. Some aircrafts (e.g., business aircrafts) may include radome-protected antennas on top of the aircraft's vertical stabilizer (e.g., tail).

To protect the larger antennas from various environmental aspects, such as precipitation, humidity, solar radiation, or other forms of debris, radomes protect radio antennas that are installed on an aircraft. Typically, radomes and antennas are manufactured separately. A shell of the radome structure, which has a greater surface area than the antenna, is placed over the antenna to shield the antenna from the outside environment. In other words, the radome shell is positioned to cover an antenna beneath it.

However, there are several drawbacks of such radome-protected antennas. A radome designed to cover an antenna, regardless of where the radome-protected antennas are located on the aircraft, inherently restricts the antenna aperture size. That is, the antenna aperture size is not as large as it otherwise could be by virtue of the radome shell having a greater surface area than the antenna. Typically, the positioning of the antenna relative to the radome shell is such that the gap between the antenna and the radome shell is relatively large, which substantially limits the antenna aperture size. For example, the gap should be large enough so that a movable antenna (e.g., a mechanically-steered antenna) contained beneath the radome shell can rotate without colliding into the radome shell. Even non-movable antennas can require a relatively large distance between the antenna and the radome shell due to differences in the geometries of the antenna and radome shell. For example, a flat antenna array can be 6-12 inches away from a radome shell that is spherical in nature. In other words, conventional radome-protected antennas are not specifically designed to maximize the antenna aperture size. Further, depending if on the placement on the aircraft, some areas of the radome structure's shell may be constructed with thick materials that attenuates signals from/to the antennas beneath it. For example, radome-protected antennas that are mounted on the vertical stabilizer may exhibit thicker materials at the front of the radome than at the top of the radome to protect the antennas from bird strike, at the expense of the antennas' ability to permeate signals through the front of the radome.

SUMMARY OF THE DISCLOSURE

The present embodiments generally describe an antenna that is embedded within or proximate to a shell of a radome, in a manner that maximizes an aperture of the antenna. For example, an antenna array can exhibit a non-flat geometry to correspond to the non-flat geometry of the radome shell, so that the surface area of at least a portion of the radome shell is as close as possible to a corresponding portion of the antenna array nearest to (or embedded within) the radome shell. By minimizing the distance between the antenna array and the radome shell, the antenna array can be considered to "hug" the contours (e.g., curvature) of the radome shell, and thereby exhibit the maximum aperture given the placement of the radome shell relative to the antenna array.

In some embodiments, by embedding the antenna within the radome shell, the radome shell and antenna are effectively the same structure. Therefore, in contrast to typical radome/antenna structures that limit the antenna aperture size by way of positioning the radome shell to cover the antenna beneath it, such that the radome shell and the antenna are effectively different structures, the shell of the radome/antenna structure of the embodiments described herein maximize the aperture size of the antenna.

In other embodiments, by positioning the antenna proximate to the radome shell to maximize the aperture size of the antenna (e.g., such that the separation between the antenna and radome shell is no greater than 1.4 inches), the disclosed radome-protected antennas herein improve conventional radome-protected antennas that are designed to have relatively large gaps between the antenna and the radome shell.

In an embodiment, an aircraft-mounted mobile communicator includes one or more antenna elements embedded within the radome shell.

In another embodiment, an aircraft includes a fuselage, a pair of wings attached to the fuselage, a vertical stabilizer, and the mobile communicator (described above) mounted to at least one of the fuselage, at least one of the wings, or the vertical stabilizer of the aircraft.

BRIEF DESCRIPTION OF THE DRAWINGS

The figures described below depict various aspects of the mobile communicator and aircraft disclosed herein. It should be understood that each figure depicts an embodiment of a particular aspect of the disclosed aircraft-mounted mobile communicator, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1:
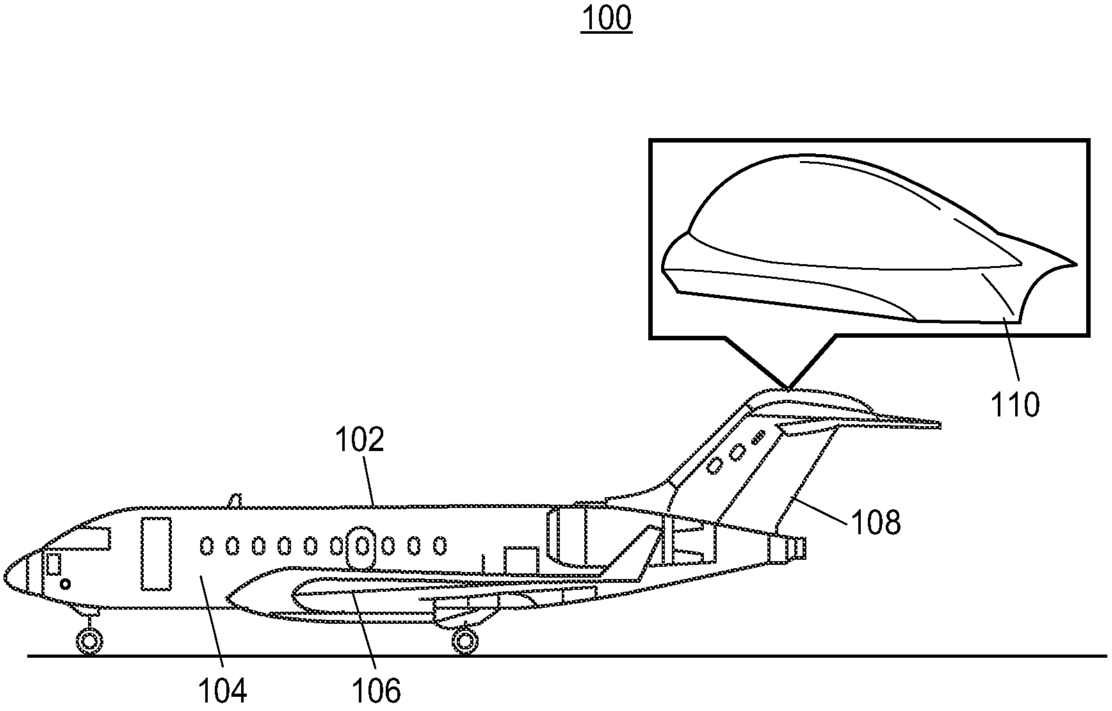
FIG. 1 is a side view of an aircraft-mounted mobile communicator in accordance with the described embodiments.

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

As described in some of the embodiments herein, an aircraft-mounted mobile communicator that includes an antenna embedded into a radome is disclosed. Particularly, the antenna is embedded in the shell of a radome structure such that the antenna is an integral part of the shell of the radome structure, thereby maximizing the aperture size of the antenna.

In addition to maximizing the aperture size of an antenna, there are several other benefits of embedding the antenna into a shell of a radome structure as opposed to covering the antenna with the radome shell. For instance, a conventional radome shell designed to cover an antenna beneath it typically blocks the antenna's ability to transmit and receive radio frequency signals, as such signals would have to pierce the radome shell, resulting in excessive signal attenuation. Some areas of a conventional radome shell, such as the front or rear of the radome shell, may be designed with thicker materials or otherwise be more mechanically rigid in relation to other sections of the radome shell, which exacerbates the problem of excessive signal attenuation in those areas.

In contrast, an antenna embedded into the shell of the radome structure would eliminate this problem, because there is no radome shell covering the antenna beneath it. The antenna elements effectively have direct line of sight to the satellite or ground based radio facility and no longer have to transmit and/or receive signals through the radome shell. In some embodiments, if desired, a protective layer may be added on top of the shell to protect its embedded antenna elements. However, in contrast to a conventional radome shell that serves to protect the antenna from the outside environment, the protective layer may be made out of a more signal-permeable material, such as Dyneema® fiber, in such embodiments.

In some scenarios, it may still be beneficial to design radome-protected antennas such that a radome shell covers an antenna beneath it. As described in some of the embodiments herein, an aircraft-mounted mobile communicator that includes an antenna proximate to a shell of a radome is disclosed, such that the aperture size of the antenna is maximized to the extent allowable by the radome shell covering.

Turning now to the Figures, FIG. 1 illustrates a mobile platform 100, such as a commercial or business aircraft, which has a fuselage or body 102, a rear or aft end 104, a pair of wings 106, a vertical stabilizer 108, and a platform-mounted mobile communicator 110. As illustrated in one embodiment, the platform-mounted mobile communicator 110 has a radome-antenna composite structure that is specifically configured to conform to the top of the vertical stabilizer 108. As different platforms, such as aircrafts, may have different vertical stabilizer shapes and dimensions unique to vertical stabilizers generally, such as a curved contour as opposed to generally flat contours of the fuselage, the platform-mounted mobile communicator 110 may be appropriately designed to fit the curvature of the particular vertical stabilizer.

Mounting the mobile communicator 110 on the vertical stabilizer 108 as opposed to another area of the mobile platform 100 (e.g., fuselage 102) may be advantageous from cost and/or aesthetics perspectives. For instance, mounting the mobile communicator 110 on the vertical stabilizer 108 would likely minimize structural modifications to the aircraft to support its installation, unlike fuselage-mounted antenna/radomes that trigger expensive airworthiness certification caused by extensive and expensive structural modifications, which impacts the aircraft type certificate. Further, mounting the mobile communicator 110 on the vertical stabilizer 108 may leave real estate for other electrical components typically reserved for installation on the fuselage 102. Mounting the mobile communicator 110 on the vertical stabilizer 108 particularly as opposed to on a different area of the mobile platform 100, may also maintain aerodynamic properties for certain types of the mobile platform 100, such as an aircraft.

Nevertheless, it should be understood that this disclosure should not be limited to mounting the mobile communicator 110 on the vertical stabilizer 108 of an aircraft. In other embodiments, the platform-mounted mobile communicator 110 may be configured to conform to other areas of an aircraft, ship, or automobile, such as the top or bottom portion of the fuselage or body 102, for example. Regardless of where the mobile communicator 110 is located on the mobile platform 100, because the mobile communicator 110 includes an antenna embedded within or proximate to a shell of the radome structure, the structural configuration of the mobile communicator 110 advantageously maximizes the antenna aperture size, thereby increasing the antenna's efficiency.

The platform-mounted mobile communicator 110 may communicate with a satellite, a ground based radio facility, and/or allow a beam from the antenna elements embedded within or proximate to the platform-mounted mobile communicator 110 to be scanned down to or below the horizon when the aircraft is traveling at high latitudes or banking. It should be noted that the disclosed structure is not limited in application to an aircraft. The disclosure could be applied to virtually any type of platform (e.g., automobiles, trains, boats, submarines, etc.) or stationary radar facilities.

Figure 2:
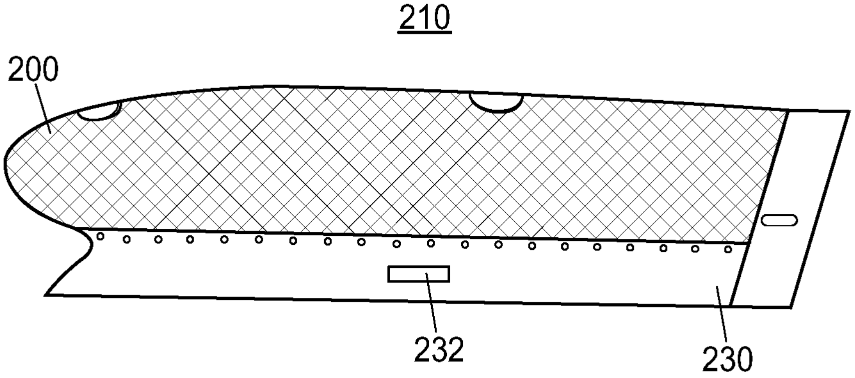
FIG. 2 is a side view of one embodiment of the mobile communicator of FIG. 1.

As illustrated in FIG. 1, the mobile communicator 110 includes an antenna proximate to a shell of the radome structure that covers the antenna. As such, the antenna is hidden from view. In contrast, as shown in FIG. 2, the platform-mounted mobile communicator 210 can include an antenna array 200 that is embedded into the shell 230 of a radome structure. As such, the antenna is visible, along with the shell 230. Like the antenna proximate to the shell of the radome structure illustrated in FIG. 1, antenna array 200 may generally represent one or more radiating antenna elements operable to transmit and receive electromagnetic signals. In particular embodiments, antenna array 200 may represent an electronically steered antenna (ESA) or a phased-array antenna. In some embodiments, the antenna array 200 may include more than one type of antenna element, such as an ESA antenna element and GPS antenna element. In some embodiments, the antenna elements may be spaced apart from each other to account for various operation characteristics, such as heatsinking, mounting, transmission/reception performance, etc. In some embodiments, the antenna array 200 may be configured to transmit radio signals to a communications satellite and receive radio signals from a communications satellite. In some embodiments, the antenna array 200 may be configured to transmit radio signals to a ground based radio facility and receive radio signals from a ground based radio facility.

Because the antenna array 200 is embedded within the radome shell 230, the antenna array 200 is secured within the radome shell 230 and is in direct line of sight to a satellite or ground based radio facility. Accordingly, the antenna array 200 need not transmit and/or receive signals through material conventionally used to construct the radome shell. As such, the platform-mounted mobile communicator 210 may have suitable mechanical strength requirements and radio signal attenuation properties that satisfy local damage regulations and other properties (e.g., related to aerodynamics, computational fluid dynamics, structural loads, temperature, vibration, shock, aesthetic) while meeting radio wave attenuation target characteristics and supporting other goals, such as high data rate (e.g., 100 Mbps). As described above, the surface area of the platform-mounted mobile communicator 210 (i.e., the radome shell 230) may be sized (e.g., 500 square inches) to embed antenna elements within, maximizing the antenna aperture size to support high data rates to and from the mobile platform 100 in the process.

In some embodiments, a controller 232 may be embedded within the radome shell 230 or enclosed underneath the radome shell 230. In other embodiments, the controller 232 may be installed separately on the mobile platform 110. In any event, the controller 232 may be a computer or real-time controller adapted and configured to execute various software applications and functions to select which antenna elements to use to communicate with the constellation of satellites or base stations using the selected antenna array. In one implementation, the controller 232 may include a processor that is operatively connected to a database (e.g., one or more hard disk drives, optical storage drives, solid state storage devices, etc.), such that the processor may access data stored in the database when executing various functions and tasks associated with the operation of the platform-mounted mobile communicator 210. The data stored in the database may include, for example, geographic location data from a GPS unit, sensor data from a signal sensor, application data for the plurality of applications, routine data for the plurality of routines, or other kinds of data.

The signal sensor may be operatively connected to one or more antenna elements to enable or disable the one or more antenna elements. The signal sensor may be used to gather signal data, which includes information about signal strength and signal quality. The signal sensor may gather information about signal-noise ratio, attenuation, interference, degradation, electromagnetic environment, or any other measurements indicating factors that may affect how effectively the platform-mounted mobile communicator 210 is able to transmit signals to and receive signals from the constellation of satellites or base stations.

The GPS unit may use satellite GPS or any other suitable global positioning protocol (e.g., the GLONASS system operated by the Russian government) or system that locates the position of the mobile platform 100 and/or the platform-mounted mobile communicator 210. Those of ordinary skill in the art will appreciate that the positional data need not come directly from a satellite as it could be data obtained or derived from an Inertial Reference System (IRS) of the aircraft.

Figure 3A:
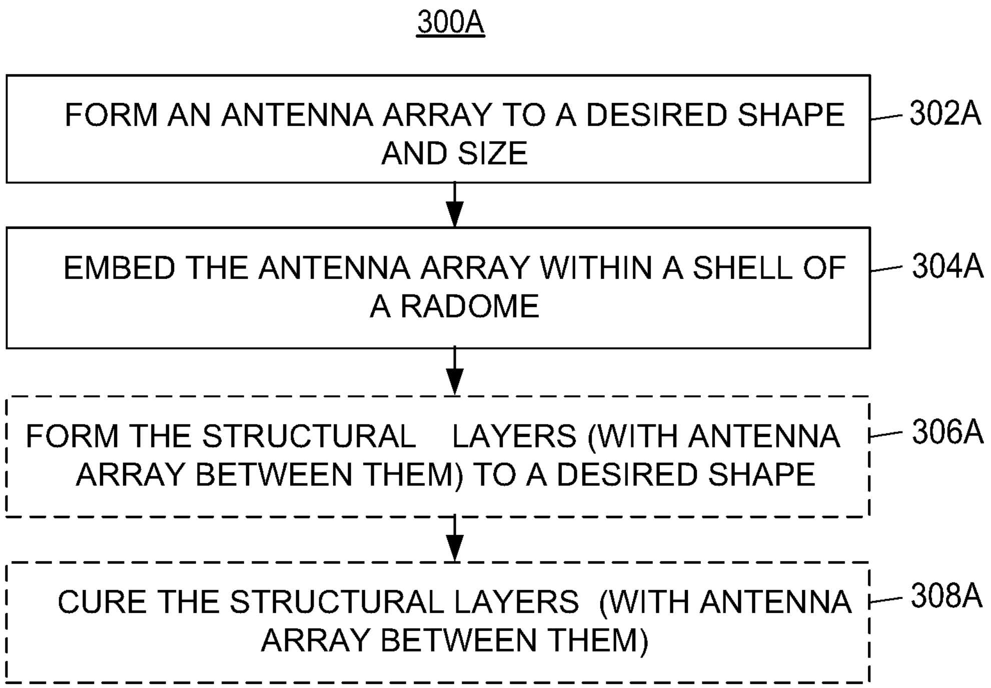
FIG. 3A is a flowchart illustrating a method for manufacturing one embodiment of the mobile communicator of FIG. 1.

Now referring to FIG. 3A, FIG. 3A illustrates a method 300A for manufacturing the platform-mounted mobile communicator 210, in accordance with a particular embodiment. The illustrated method 300A begins at step 302A wherein an antenna array 200 is formed to a desired shape and size so that it may be embedded in currently existing or newly developed radomes. The antenna array 200 may include antenna elements on a printed circuit board (PCB), such as microstrip antenna, or in the form of an integrated circuit (IC), such as an application-specific integrated circuit (ASIC). Selection of the antenna elements to embed within the radome shell depends on the specific design needed, and the antenna elements can be modified to operate over one or more frequency bands suitable for particular types of communication (e.g., GPS, radio).

Figure 4:
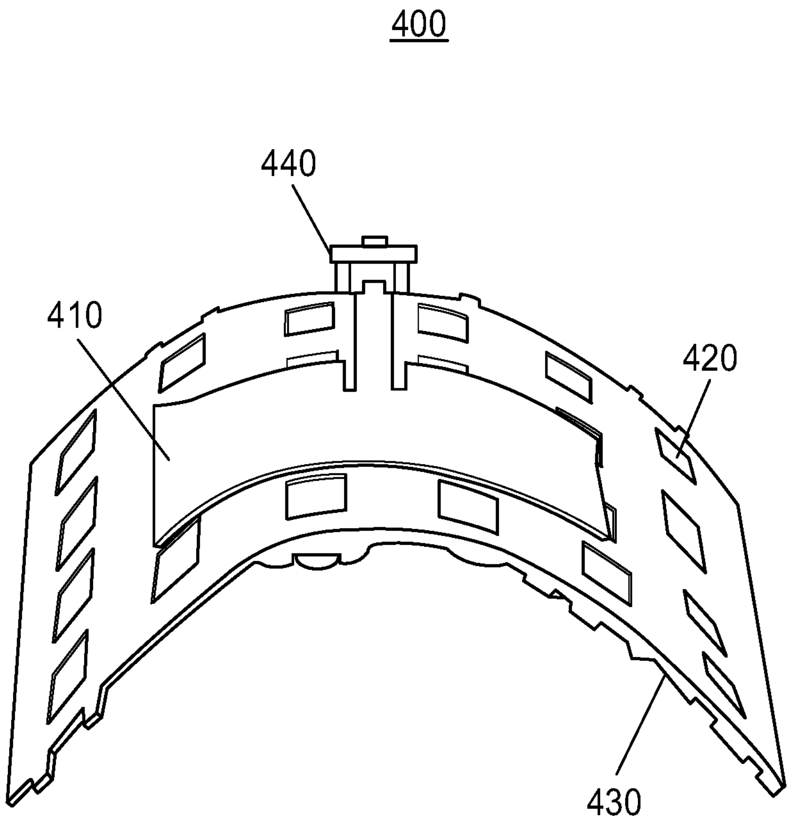
FIG. 4 is a diagram of a microstrip patch antenna included in one embodiment of the mobile communicator of FIG. 1.
Figure 5A:
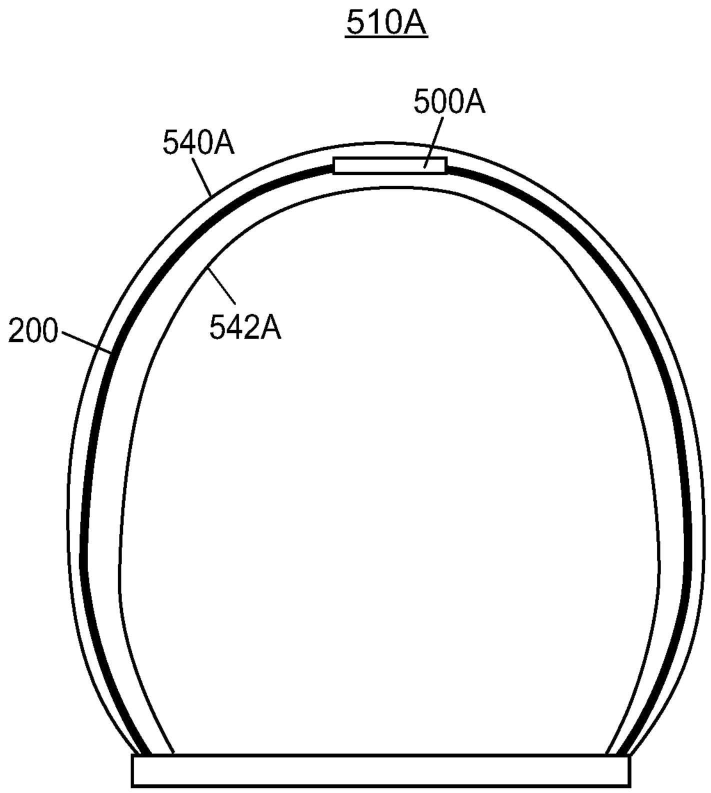
FIG. 5A is a diagram of one embodiment of the mobile communicator of FIG. 1.

Particularly, in some embodiments, the antenna array 200 may include a plurality of microstrip patch antennas 400, one of which is shown in FIG. 4 with a non-flat geometry and having at least three layers: a first layer 410 having an array of conducting patches made from a conducting flexible textile, a second layer 420 having an array of non-conducting flexible textiles that acts as a dielectric substrate, and a third layer 430 having an array of conducting patches made from a conducting flexible textile that acts as a ground plane. The second layer 420 is placed between the first layer 410 and the third layer 430, and one or more conducting patches may include a conducting via (e.g., a metal pin) connecting it to another conducting patch. The first layer 410 and the third layer 430 may represent two terminals of an antenna, such that electromagnetic waves in various frequencies are created and used for communication (e.g., GPS, radio) purposes when an oscillating (AC) voltage difference is applied between the ground plane and the microstrip patch. Each of the microstrip patch antennas 400 may include a set of flexible textiles across the three layers suitable to resonate in one or more bands, such as an $L_1$ band (e.g., 1575.42 MHz), $L_2$ band (e.g., 1227.60 MHz) (e.g., a GPS antenna), $K_u$ band (e.g., 12-18 GHz), the $K_a$ band (e.g., 17.1-31 GHz) (e.g., a satellite antenna), and/or 849-851 MHz and 894-896 MHz to support a direct air-to-ground (ATG) communication link between the mobile platform 100 and ground stations. Of course, other bands or spectrums may be used, such as the V band or European Aviation Network spectrum (e.g., 1,980-1,995 MHz and 2,170-2,185 MHz). Further, it will be understood that bands outside the microwave spectrum may be used. The plurality of microstrip patch antennas 400 may be formed on the antenna array 200 in any order. For example, as shown in FIG. 5A, a GPS antenna 500A may be at the center of the antenna array 200 such that the GPS antenna 500A is at the apex of the platform-mounted mobile communicator 510A.

The first layer 410 may also include one or more electrical components 440 that provide an electrical feed to the microstrip patch antenna 400, in some embodiments. In other embodiments, the electrical components 440 may be affixed underneath the platform-mounted mobile communicator 210 (e.g., underneath structural layer 542A as shown in the platform-mounted mobile communicator 510A of FIG. 5A). In operation, the electrical feed from electrical components 440 may generally enable the microstrip patch antenna 400 to generate an electric field. Electrical components 440 may include a connector, circuit board, and transmission/reception (Tx/Rx) elements.

The connector represents a transmission feed line that provides electrical connectivity to the microstrip patch antenna 400. In a particular embodiment, the connector is an electromagnetic coupling device that feeds the microstrip patch antenna 400 through electromagnetic signals. In such an embodiment, a connector pin is not required to be inserted through structural layer 542A. In an alternate embodiment, the connector may directly couple to the microstrip patch antenna 400 by inserting a feed line through structural layer 542A. Tx/Rx elements include any combination of elements that control the transmission and reception of electromagnetic signals. More particularly, Tx/Rx elements may include a phase shifter, an isolator, and/or an amplifier.

Referring back to FIG. 3A, at step 304A, the antenna array 200 is embedded within the structural layer 542A (e.g., the radome shell 230). In some embodiments, structural layer 542A may include one or more openings for receiving the antenna array 200. In some embodiments, also at step 304A, a protective structural layer 540A is placed above the structural layer 542A (and therefore the antenna array 200) to encapsulate the antenna array 200 embedded within the structural layer 542A. In such embodiments, the structural layer 540A may generally provide further structural and environmental support and protection for the antenna array 200. Exemplary materials of structural layers 540A, 542A may include materials that may provide beneficial electromagnetic and/or structural characteristics, such as Dyneema® fiber and composite material, respectively.

In some embodiments, at step 306A, structural layers 542A (with antenna array 200 embedded within) and optionally structural layer 540A are formed to a desired shape (e.g., a curved surface of a vertical stabilizer, a flat surface of a fuselage). It should be noted that at this point, structural layers 540A, 542A have not been cured. Accordingly, structural layers 540A, 542A are substantially pliable and may be molded such that the structural layers 540A, 542A substantially conform to the shape or curvature of the platform-mounted mobile communicator 510A. The structural layer 542A and optionally structural layer 540A may be molded into a variety of shapes based on the intended application of the platform-mounted mobile communicator 510A, which upon being cured, becomes the final radome shell.

In some embodiments, at step 308A, structural layers 540A, 542A are cured. Curing the structural layers may be effectuated by applying heat or pressure. Once cured, the structural layers will become substantially rigid, and the antenna array 200 will be protected from environmental hazards during operation.

Modifications, additions, or omissions may be made to the platform-mounted mobile communicator 510A. It should be noted that the described applications for the platform-mounted mobile communicator 510A are intended to serve as examples and not to limit the range of applications for which the platform-mounted mobile communicator 510A may be applied. For example, instead of including one or more electrical components 440 in the first layer 410 when forming the antenna array 200 at step 302A, electrical components 440 may be installed after step 308A. In such a case, installation of electrical components 440 may include affixing all or part of electrical components 440 to the interior of the platform-mounted mobile communicator 510A (e.g., on the structural layer 542A).

Figure 3B:
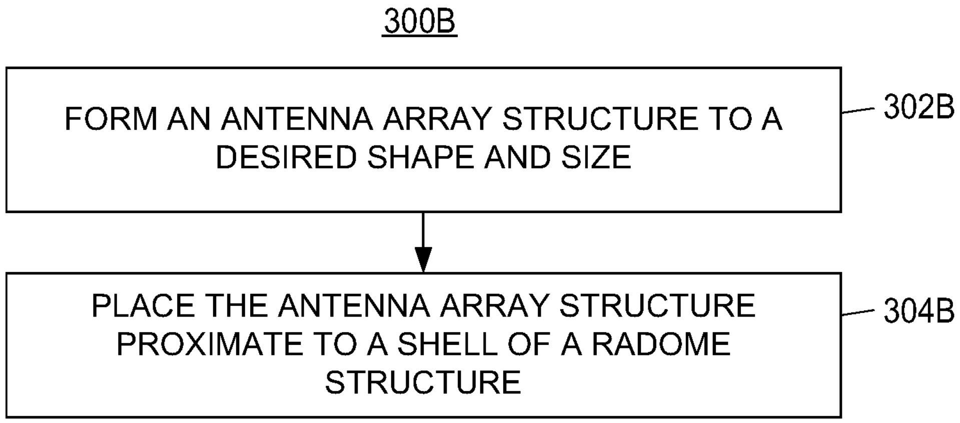
FIG. 3B is a flowchart illustrating another method for manufacturing one embodiment of the mobile communicator of FIG. 1.

Now referring to FIG. 3B, FIG. 3B illustrates a method 300B for manufacturing the platform-mounted mobile communicator 110. The illustrated method 300B begins at step 302B wherein an antenna array is formed to a desired shape and size so that it may be placed proximate to currently existing or newly developed radomes. In some embodiments, the antenna array may include a plurality of microstrip patch antennas 400, one of which is shown in FIG. 4.

In other embodiments, the antenna array may be in the form of a tile. In one particular embodiment, a top surface of a tile may include one or more antenna elements, and the bottom surface of the tile may include one or more electrical components (e.g., any of the electrical components 440 described above) for controlling the antenna elements. Each of the antenna elements may operate on any of the frequencies described above. In some cases, the tile may be one of a plurality of tiles, where all of the tiles may be fastened together (e.g., along the edges of the tiles) as part of an arrangement of tiles, yet each configured to be foldable along the edges. As such, the tiles may be folded to form a structure having non-flat geometry to match the same or similar non-flat geometry (e.g., curvature) of the radome shell, so that when the radome shell fits over the folded arrangement of tiles, each tile is proximate to the adjacent surface of the radome shell. In some cases, as part of step 302B, the tiles may be supported by a truss that resembles the shape of the radome shell.

Figure 5B:
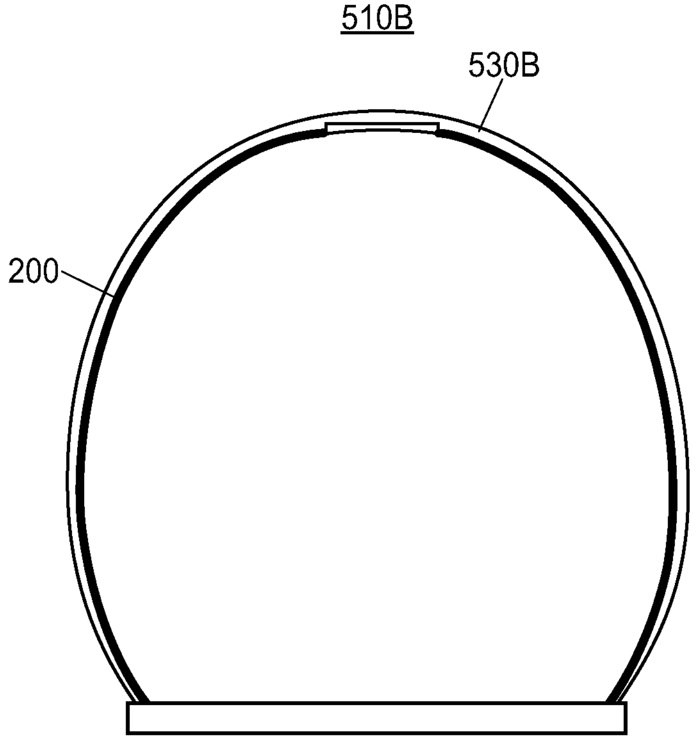
FIG. 5B is a diagram of another embodiment of the mobile communicator of FIG. 1.

At step 304B, the antenna array is placed proximate to the radome shell, such that the radome shell acts as a covering for the antenna array. Because the antenna array is shaped to resemble the shape of the radome shell at step 302B, the radome shell tightly fits over the antenna array. The only spacing between the radome shell at the antenna array may be attributed to necessary engineering tolerances, so that the aperture of the antenna array is maximized. For example, as shown in the platform-mounted mobile communicator 510B of FIG. 5B, an antenna array 200 includes one or more tiles that are placed proximate to the radome shell 530B, such that the one or more tiles conform to the contours (e.g., curvature) of the radome shell 530B that covers the antenna array 200. That is, the antenna array 200 is shaped to match the shape of the radome shell 530B, and thus exhibits the same or similar non-flat geometry as that of the radome shell 530B. The top surfaces of the tiles face toward the adjacent surface of the radome shell 530, and the bottom surfaces of the tiles face away from the adjacent surface. The distance or gap between the top surfaces of the tiles that comprise the antenna array 200 and the adjacent surface of the radome shell 530 is minimal (e.g., no greater than 1.4 inches), to maximize the antenna aperture of the antenna array.

Although not shown, in some embodiments, the gap may be filled with "filler" material, such as a dielectric foam material, to minimize moist particle build-up that can significantly attenuate RF signals from/to the antenna array. The dielectric foam in particular may increase the dielectric constant of the antenna array to improve protection against lightning strikes, as well as minimize rattle between the radome shell and the antenna array.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. For example, software may include calibration routines to null any manufacturing and installation imperfections. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory product to which it is communicatively coupled. A further hardware module may then, at a later time, access the memory product to retrieve and process the stored output. Hardware modules may also initiate communications with input or output products, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

Aspect 1. A mobile platform-mounted mobile communicator for communicating with one or more satellites or base stations, the mobile platform-mounted mobile communicator comprising: a radome structure; and one or more antenna elements embedded within or proximate to a shell of the radome structure that maximizes an aperture of the one or more antenna elements, wherein the one or more antenna elements are configured to operate over one or more frequency bands.

Aspect 2. The mobile platform-mounted mobile communicator of aspect 1, wherein the mobile platform-mounted mobile communicator is mounted to one of an aircraft, an automobile, or a ship.

Aspect 3. The mobile platform-mounted mobile communicator of either aspect 1 or 2, wherein the radome structure further comprises a protective layer over the shell.

Aspect 4. The mobile platform-mounted mobile communicator of any one of aspects 1-3, wherein the one or more antenna elements are configured to operate as an electronically steered antenna (ESA) or a phased-array antenna.

Aspect 5. The mobile platform-mounted mobile communicator of any one of aspects 1-4, wherein the radome structure comprises composite material.

Aspect 6. The mobile platform-mounted mobile communicator of any one of aspects 1-5, further comprising Dyneema® fiber.

Aspect 7. The mobile platform-mounted mobile communicator of any one of aspects 1-6 wherein the one or more frequency bands is one of a $L_1$ band, an $L_2$ band, a $K_u$ band, a $K_a$ band, or a V band.

Aspect 8. The mobile platform-mounted mobile communicator of any one of aspects 1-7, wherein the one or more antenna elements are configured to operate over (i) 849-851 MHz and 894-896 MHz or (ii) 1,980-1,995 MHz and 2,170-2,185 MHz.

Aspect 9. The mobile platform-mounted mobile communicator of any one of aspects 1-8, wherein the one or more antenna elements comprise: a first layer of conducting flexible textiles; a second layer of non-conducting flexible textiles acting as a dielectric substrate, and a third layer of conducting flexible textiles acting as a ground plane.

Aspect 10. The mobile platform-mounted mobile communicator of any one of aspects 1-9, wherein the first layer further comprises one or more electrical components providing an electrical feed to the one or more antenna elements.

Aspect 11. The mobile platform-mounted mobile communicator of any one of aspects 1-10, wherein the one or more antenna elements are included in one or more tiles that are foldable to become proximate with the shell of the radome structure.

Aspect 12. The aircraft-mounted mobile communicator of any one of aspects 1-10, wherein a gap between the one or more antenna elements proximate to the shell of the radome structure and the shell of the radome structure is minimized.

Aspect 13. The aircraft-mounted mobile communicator of aspect 12, wherein a material fills the gap.

Aspect 14. An aircraft comprising the mobile platform-mounted mobile communicator of any one of aspects 1-13.

Aspect 15. An automobile comprising the mobile platform-mounted mobile communicator of any one of aspects 1-13.

Aspect 16. A ship comprising the mobile platform-mounted mobile communicator of any one of aspects 1-13.

What is claimed:

1. A mobile communicator mounted on an aircraft for communicating with one or more satellites or base stations, the mobile communicator comprising:

a radome structure that mounts externally to a substrate, the substrate being one of a fuselage, a wing, or a vertical stabilizer of the aircraft, the radome structure including a radome shell having a non-flat geometry relative to the substrate such that a space is formed between the radome shell and the substrate; and one or more antenna elements embedded within the formed space in the radome structure and forming a gap between the one or more antenna elements and the radome shell, wherein the gap is minimized via the one or more antenna elements being contoured according to the non-flat radome shell of the radome, such that the one or more antenna elements exhibit the non-flat geometry relative to the substrate to have a substantially constant distance from the radome shell and a varying distance from the substrate, wherein the one or more antenna elements are configured to operate over one or more frequency bands.

2. The mobile communicator of claim 1, wherein the one or more antenna elements are configured to operate as an electronically steered antenna (ESA).

3. The mobile communicator of claim 1, wherein the one or more antenna elements are configured to operate as phased-array antenna.

4. The mobile communicator of claim 1, wherein the one or more frequency bands comprises a $K_a$ band, a $K_u$ band, a V band, an $L_1$ band, or an $L_2$ band.

5. The mobile communicator of claim 1, wherein the one or more frequency bands comprises (i) 849-851 MHz and 894-896 MHz or (ii) 1,980-1,995 MHz and 2,170-2,185 MHz.

6. The mobile communicator of claim 1, wherein the one or more antenna elements comprise:

a first layer of conducting flexible textiles;

a second layer of non-conducting flexible textiles acting as a dielectric substrate, and a third layer of conducting flexible textiles acting as a ground plane.

7. The mobile communicator of claim 6, wherein the first layer further comprises one or more electrical components providing an electrical feed to the one or more antenna elements.

8. The mobile communicator of claim 1, wherein the radome structure includes one or more openings for receiving the one or more antenna elements.

9. The mobile communicator of claim 1, wherein the gap between the one or more antenna elements and the radome shell of the radome structure is filled with a dielectric filler material over a top surface of the one or more antenna elements.

10. An aircraft comprising:

a fuselage;

a pair of wings attached to the fuselage;

a vertical stabilizer; and a mobile communicator for communicating with one or more satellites or base stations, the mobile communicator comprising one or more antenna elements embedded within a radome structure, wherein the one or more antenna elements are configured to operate over one or more frequency bands, and wherein the radome structure mounts externally to a substrate, the substrate being one of the fuselage, at least one of the wings, or the vertical stabilizer of the aircraft, the radome structure including a radome shell having a non-flat geometry relative to the substrate such that a space is formed between the radome shell and the substrate, wherein the one or more antenna elements are embedded within the formed space in the radome structure to form a gap between the one or more antenna elements and the radome shell, such that the one or more antenna elements exhibit the non-flat geometry relative to the substrate to have a substantially constant distance from the radome shell and a varying distance from the substrate, wherein the gap is minimized via the one or more antenna elements being contoured according to the non-flat radome shell of the radome structure.

11. The aircraft of claim 10, wherein the one or more antenna elements are configured to operate as an electronically steered antenna (ESA).

12. The aircraft of claim 10, wherein the one or more antenna elements are configured to operate as phased-array antenna.

13. The aircraft of claim 10, wherein the one or more frequency bands comprises a $K_a$ band, a $K_u$ band, a V band, an $L_1$ band, or an $L_2$ band.

14. The aircraft of claim 10, wherein the one or more frequency bands comprises (i) 849-851 MHz and 894-896 MHz or (ii) 1,980-1,995 MHz and 2,170-2,185 MHz.

15. The aircraft of claim 10, wherein the one or more antenna elements comprise:

a first layer of conducting flexible textiles;

a second layer of non-conducting flexible textiles acting as a dielectric substrate, and a third layer of conducting flexible textiles acting as a ground plane.

16. The aircraft of claim 15, wherein the first layer further comprises one or more electrical components providing an electrical feed to the one or more antenna elements.

17. The aircraft of claim 10, wherein the radome shell of the radome structure includes one or more openings for receiving the one or more antenna elements.

18. The aircraft of claim 10, wherein the gap between the one or more antenna elements and the radome shell of the radome structure is filled with a dielectric filler material over a top surface of the one or more antenna elements.

* * * * *